(12) United States Patent
Breckenridge, Jr.

(10) Patent No.: US 6,257,521 B1
(45) Date of Patent: Jul. 10, 2001

(54) SHIMMY-FREE AIRCRAFT TAIL WHEEL ASSEMBLY

(76) Inventor: Gerald H. Breckenridge, Jr., 135 South St., Beedeville, AR (US) 72014

( * ) Notice: Subject to any disclaimer, the term of this patent is extended or adjusted under 35 U.S.C. 154(b) by 0 days.

(21) Appl. No.: 09/520,041

(22) Filed: Mar. 7, 2000

(51) Int. Cl.$^7$ .................................................. B64C 25/00

(52) U.S. Cl. ............................................................ 244/109

(58) Field of Search ............................... 244/109, 100 R, 244/104 R

(56) References Cited

U.S. PATENT DOCUMENTS

| | | | |
|---|---|---|---|
| 2,105,374 | * | 1/1938 | Saulnier ................................. 244/109 |
| 2,329,823 | * | 9/1943 | Camburn ................................ 244/109 |
| 2,394,825 | * | 2/1946 | Trader ................................... 244/109 |
| 2,473,645 | * | 6/1949 | Hollerith ............................... 244/109 |
| 2,494,482 | * | 1/1950 | Maule .................................... 244/109 |
| 2,498,112 | * | 2/1950 | Maule .................................... 244/109 |
| 2,502,523 | * | 4/1950 | Irwin ..................................... 244/109 |
| 2,543,233 | * | 2/1951 | Dowty ................................... 244/109 |
| 2,745,612 | * | 5/1956 | Cupp ..................................... 244/109 |

* cited by examiner

Primary Examiner—Charles T. Jordan
Assistant Examiner—Christian M. Best
(74) Attorney, Agent, or Firm—Stephen D. Carver

(57) ABSTRACT

A vibration-preventing tail wheel assembly prevents an aircraft tail wheel from shimmying during the takeoffs and landings. The unit retrofits and mounts between the aircraft tail spring and the original equipment tail wheel fork. A rigid hub assembly comprising a sleeve-like, central hub is rotatably coupled to the spindle assembly. The spindle assembly has a mounting flange connected to the aircraft tail wheel fork. A rigid arm projecting from the hub is bolted to the tail spring. The spindle assembly comprises a rigid sleeve coaxially extending from a mounting flange through and within the hub assembly. A pair of bearing assemblies fitted within suitable recesses on opposite ends of the central hub contact a special bushing. An internal, elongated bolt extending upwardly from the spindle assembly terminates in a threaded terminus engaged by a castellated nut that axially secures pressures the bushing and preloads the bearings, that are secured within suitable races fitted on opposite ends of the central hub. The specially designed bushing goes under the castellated nut and fits into the upper bearing to give the alignment and proper strength needed to complete the assembly. A "pre-load" condition is then introduced to the bearings by applying a minimum of 100 fps torque to the castellated nut, compressing the bearings together axially but allowing rotation about the bolt in response to predetermined forces.

17 Claims, 10 Drawing Sheets

SHIMMY-FREE AIRCRAFT TAIL WHEEL ASSEMBLY

BACKGROUND OF THE INVENTION

I. Field of the Invention

The present invention relates generally to landing gear construction for small aircraft. More particularly, my invention relates to a tail wheel assembly for small aircraft that secures the tail wheel and eliminates jarring or jerking, and other unwanted vibration, thereby preventing tail wheel shimmying.

II. Description of the Prior Art

In general, the concept of stability relates to the characteristics of an aircraft in maintaining its course and direction. In flight, the term "stability" is often equated with the ability of the plane to fly itself. Stability can either be static or dynamic. Static stability involves only the return of the disturbed object to its original position. This was the goal of the early airplane designers; that the airplane would try to return to its original orientation (position) after a disturbance, such as a gust of wind. Dynamic stability is concerned with how much time it may take for the object to return to its original position. If the plane eventually returns to its original position, then the system is considered dynamically stable. If it does not, then it is considered dynamically unstable.

The concept of "control" is a science relating to the human experience in flying and handling a given aircraft. The concepts are related, because when "control" is optimized, a given airplane will be relatively easy for the pilot to fly, and highly stable in flight. The small airplanes used at local airports are very stable; they are good for both beginning pilots and the more experienced pilots. They are very easy to fly and very forgiving of pilot mistakes. Although usually discussed as flight characteristic, stability and control are equally important during takeoff and landing.

When the plane is in contact with the runway, sudden movements to the left or right of the landing surface are disfavored. Stability dictates that the plane move forwardly and decelerate smoothly during a landing without sudden "jerkiness." Similarly, as a plane taking off leaves the runway and breaks contact with the ground, irregular movements caused by runway-contact can affect flight path stability. One significant cause of vibration and jerkiness during takeoffs and landings is the tail wheel assembly, that can vibrate deleteriously when I contact with the runway.

While on the ground, static stability is enhanced by the normal three-point wheels of the aircraft. Usually a single tail wheel assembly at the aircraft rear completes the "third point" necessary for establishing a stable, planar position. With older small planes having "fixed" tail skid assemblies, the tail skid may be permanently oriented in a position parallel with the longitudinal axis of the airframe. In some tail wheel mounting designs, upward or downward movements of the tail wheel are enabled. However, if the tail wheels are mounted too loosely, they will shimmy or vibrate during takeoffs and landings. On the other hand, if they are secured too rigidly, and cannot "give" in response to runway contact, proper handling can be negatively affected during landings. The time periods just before liftoff, and during landings, are often critical, and yet conventional tail wheel mounting assemblies allow the reartovibrate.

The latter problem can be particular vexatious when operating agri-chemical dispensing airplanes from dirt runways. When the plane takes off, it is full of fuel and agrichemical, at maximum weight. Jolts or jerking motions imparted by vibrating tail wheel assemblies during takeoffs can be disconcerting, to say the least. When the plane returns for a landing, it is much lighter, and flight characteristics are different than they were immediately after takeoff. During a landing, when the tail wheel makes first contact with the landing surface, a "smooth" and non-jerky transition is desirable. In the fraction of a second that the plane is neither fully airborne nor fully landed, the path of least resistance for wheel movement may not be straight down the runway. In other words, because of wind gusts and numerous other variables, a sleight movement in tail wheel orientation from "true straightness" can decrease stability.

In other words, during takeoffs and landings especially, conventional tail wheel assemblies vibrate, rattle, and shimmy. If the tail wheel assembly is modified to prevent vibration, it must nevertheless be able to "give" slightly when contacting the ground.

SUMMARY OF THE INVENTION

My new shimmy-preventing tail wheel assembly mounts between a conventional aircraft tail spring and an original tail wheel fork. A rigid hub assembly comprises a sleeve-like central hub, that is mated to a lower, cooperating spindle assembly. A rigid arm projecting from the hub is bolted to the tail spring. The spindle assembly comprises a rigid, lower flange adapted to mate with the aircraft tail wheel fork. The spindle assembly is rotatable relative to the hub assembly, so the tail wheel fork supported thereby can rotate around its axis.

The spindle assembly comprises a rigid sleeve coaxially extending from a lower mounting flange through and within the hub assembly. A pair of bearing assemblies are mounted on opposite ends of the hub assembly. A special bushing aids in axially pressuring and radially centering the bearings when they are compressed together. An internal, elongated bolt extending upwardly from the spindle assembly terminates in a threaded terminus engaged by a castellated nut that axially secures the bearings within suitable races fitted on opposite ends of the central hub.

The nut is tightened to approximately one hundred foot pounds of torque to preload the assembly. This "pre-load" prevents the tail wheel from swinging freely and shimmying or vibrating. Uncontrolled shimmying results in dangerous vibration that can cause damage if continued unabated. However, the dual bearings of the present construction combined with the weight of the aircraft on the ground, easily rotates the assembly about the longitudinal axis of the torqued bolt so that the aircraft can maneuver on the ground with ease. In fact, due to the bearings, the aircraft is able to move more "freely" than if it only had conventional metal bushings, as is commonly the situation. The "pre-loading" actually pits one bearing against the other in a highly unique manner not originally intended for the bearings.

This synergistic "pre-loading" of the axially spaced-apart bearings actually acts as a "brake" that makes it impossible for the tail wheel to shimmy and shake uncontrollably during the critical takeoff and landing rolls. The special bushing assures that the torque remains constant during normal operations.

Thus a basic object is to provide a shimmy-free tail wheel mounting assembly for small aircraft.

Another basic object is to provide an after-market system for mounting tail wheels that minimizes shimmying and vibration.

Another important object is to provide a tail wheel mounting system of the character described that is suitable for user-installation.

Conversely, an important object is to provide a system of the character described that can be installed with new aircraft.

Yet another object is to provide a bushing construction that both radially centers and axially stresses the bearings.

Another basic object is to provide a highly stable and impact-resistant tail wheel system for aircraft.

Another important object is to provide an aircraft tail wheel assembly of the character described that makes it easier to take off and land, especially on irregular dirt runways or grass landing strips.

A related object is to minimize jarring or jerking effects.

A still further object is to minimize noise, and maximize strength

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
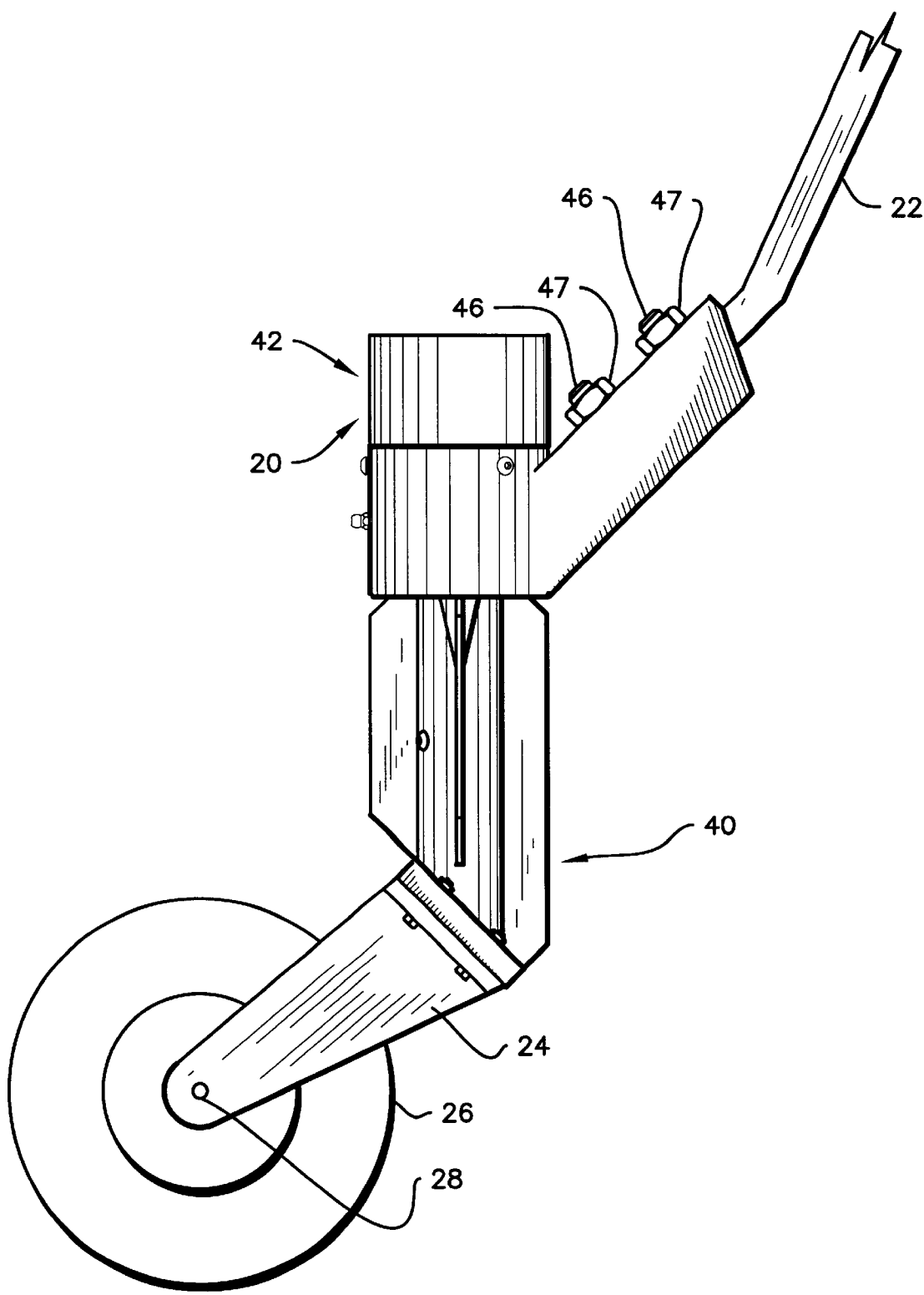
FIG. 1 is a fragmentary elevational view of the best mode of my improved tail wheel mounting system.
Figure 2:
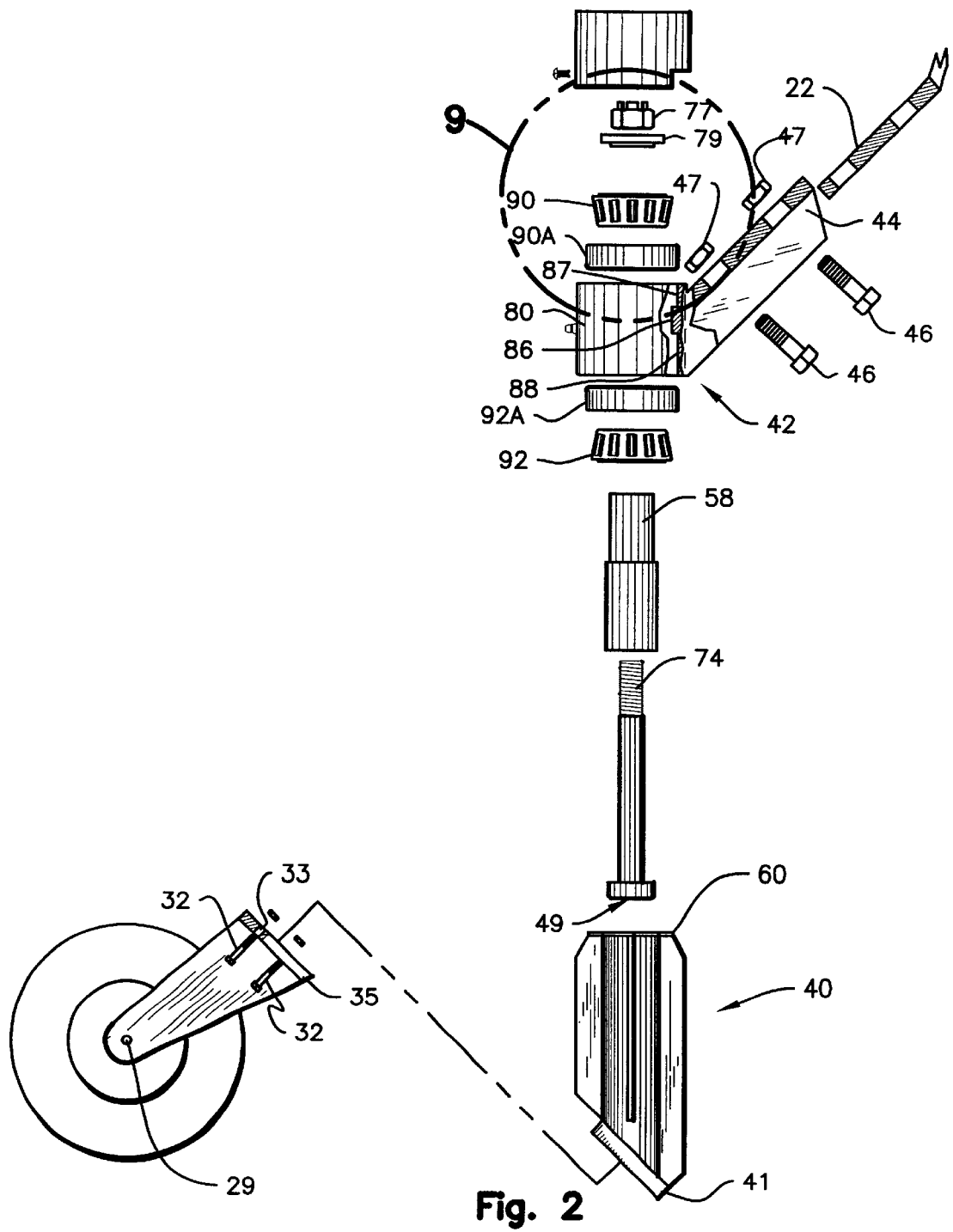
FIG. 2 is an enlarged, fragmentary, exploded isometric view, with portions broken away or shown in section for clarity and/or omitted for brevity.
Figure 3:
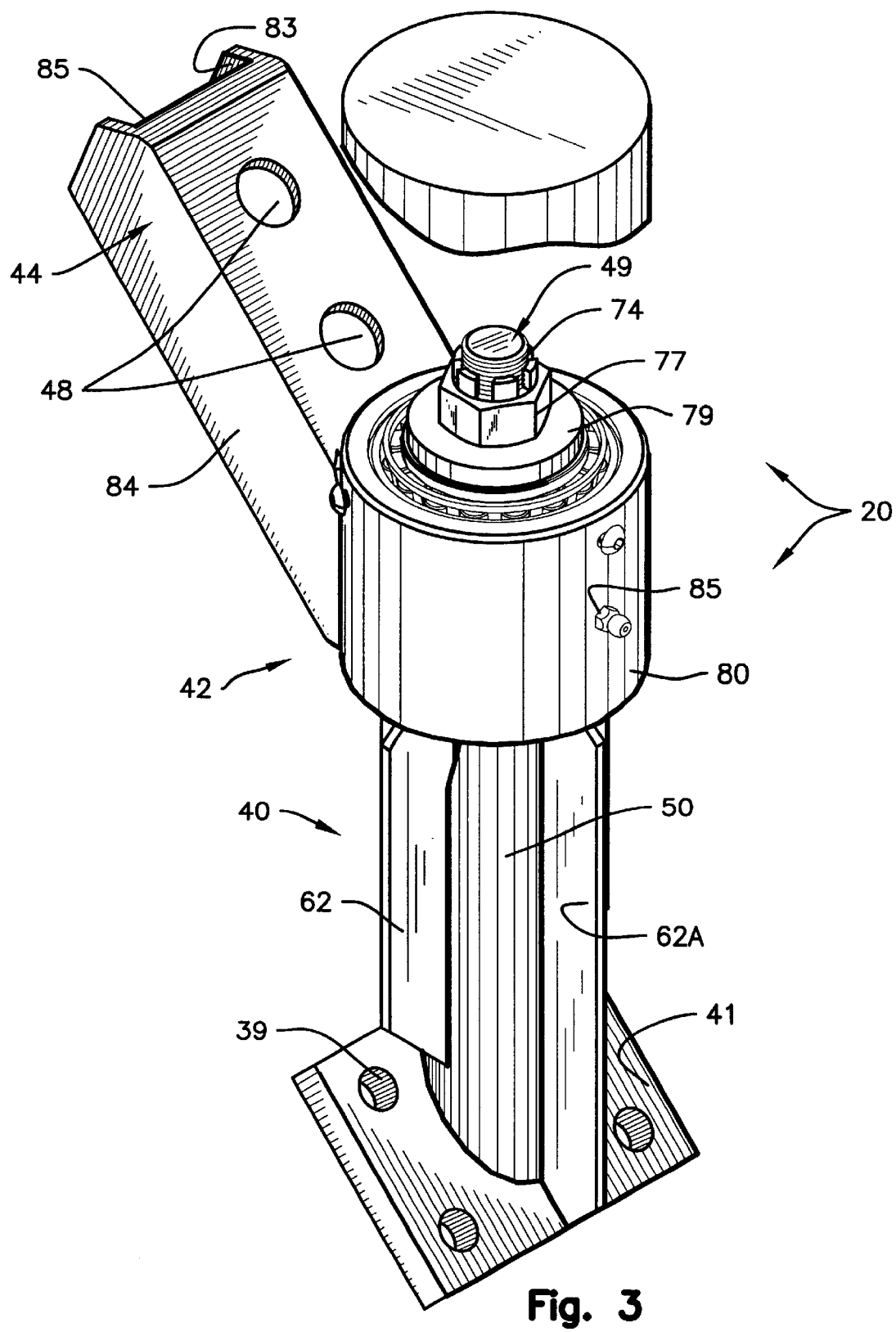
FIG. 3 is an enlarged frontal isometric view of the preferred mounting system.
Figure 6:
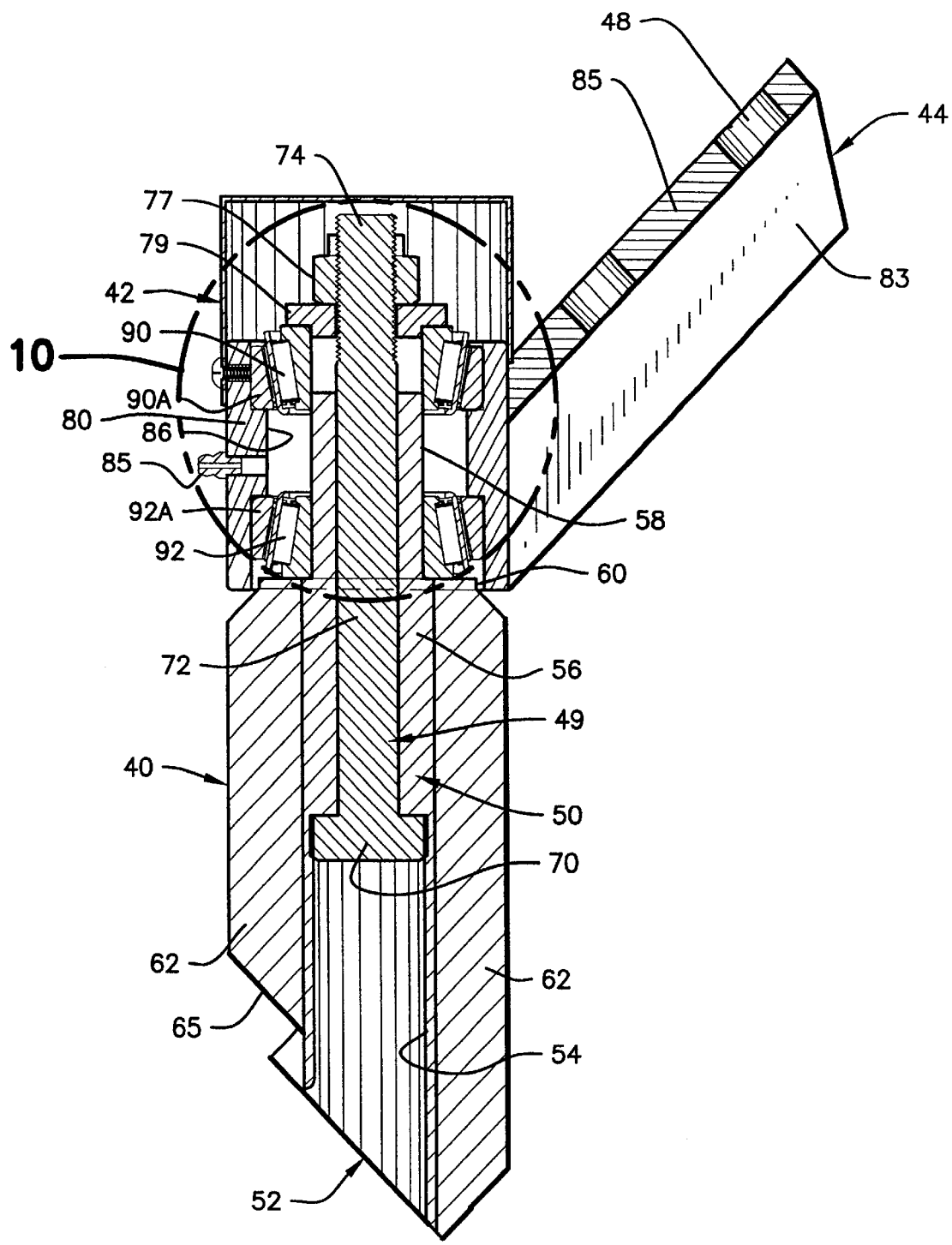
FIG. 6 is an enlarged, fragmentary, sectional view taken along line 6—6 of FIG. 5, with portions thereof broken away for clarity or omitted for brevity.

With initial reference to FIGS. 1 and 2 of the appended drawings, my shimmy-free aircraft tail wheel mounting assembly had been generally designated by the reference numeral 20. System 20 interconnects between a preexisting aircraft tail spring 22, at the rear of a small airplane, and the original aircraft tail wheel fork 24. A conventional wheel 26 that will be recognized by those with skill in the art is mounted by an axle 28 within the arms of the fork 24. Axle 28 penetrates orifice 29 (FIG. 2) in the fork. A pair of conventional bolts 31, 32 extend through orifices 33 in a fork flange portion 35 (FIG. 2) to mount the fork to the spindle assembly 40. Specifically, fork flange portion 35 is fastened to spindle flange 41 with suitable nuts (not shown) that engage bolt 32, that also penetrate orifices 39 (FIGS. 2, 3) in spindle flange 41. The spindle assembly 40 comprises the bottom section of the mounting assembly 20, and is operatively joined to the upper hub assembly 42 for rotation relative thereto about the industrial grade bolt 49 forming an axle shaft (FIGS. 2, 6). A channel-like arm 44 of the hub assembly 42 securely receives the tail spring 22 (FIG. 1), being fastened thereto with the combination of bolts 46 (FIG. 2) that penetrate orifices 48 in arm 44 and compression nuts 47.

Figure 4:
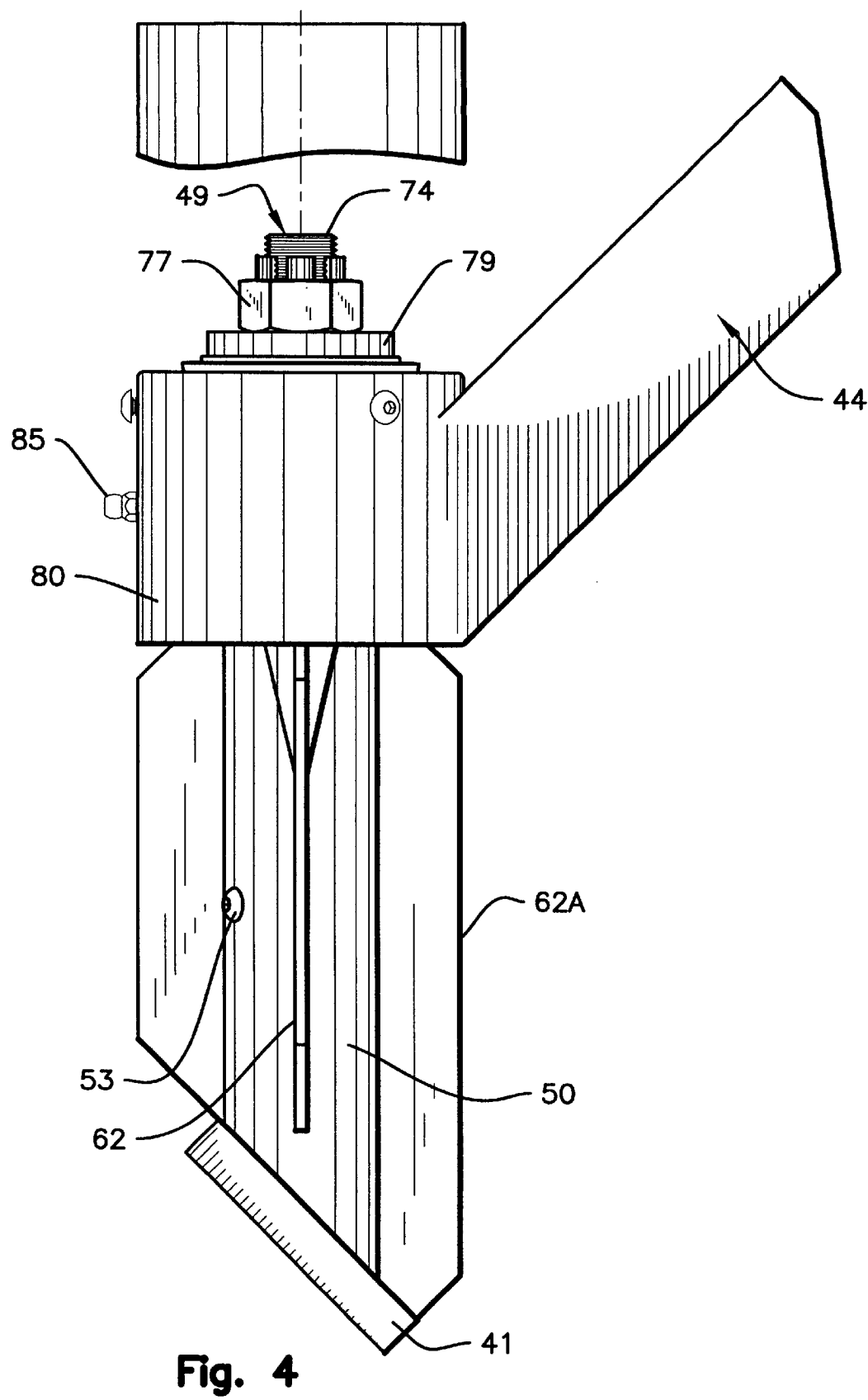
FIG. 4 is a enlarged side view of the preferred mounting system.
Figure 5:
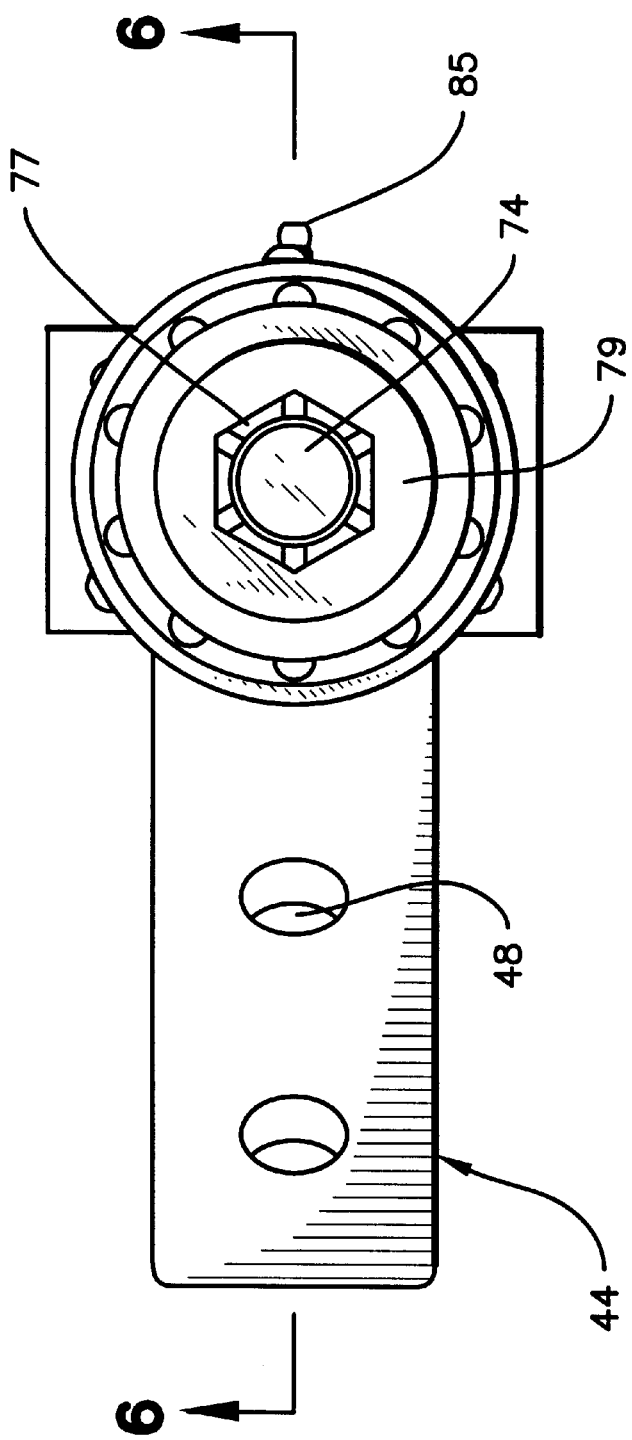
FIG. 5 is an enlarged top plan view thereof, taken from a position above the image of FIG. 4, and looking down.
Figure 7:
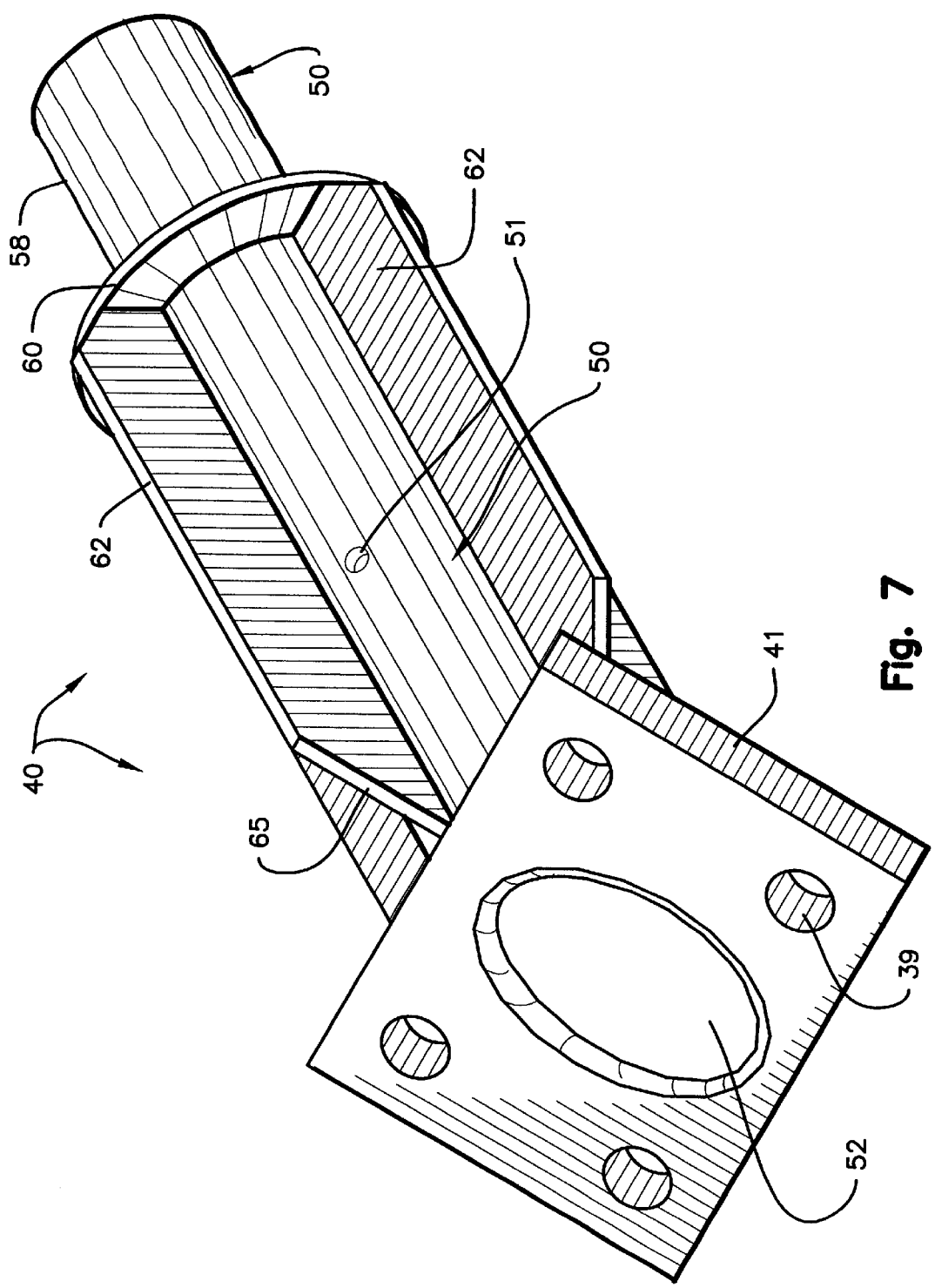
FIG. 7 is an enlarged, isometric view thereof, taken generally from a position to the lower left of the image of FIG. 6.
Figure 8:
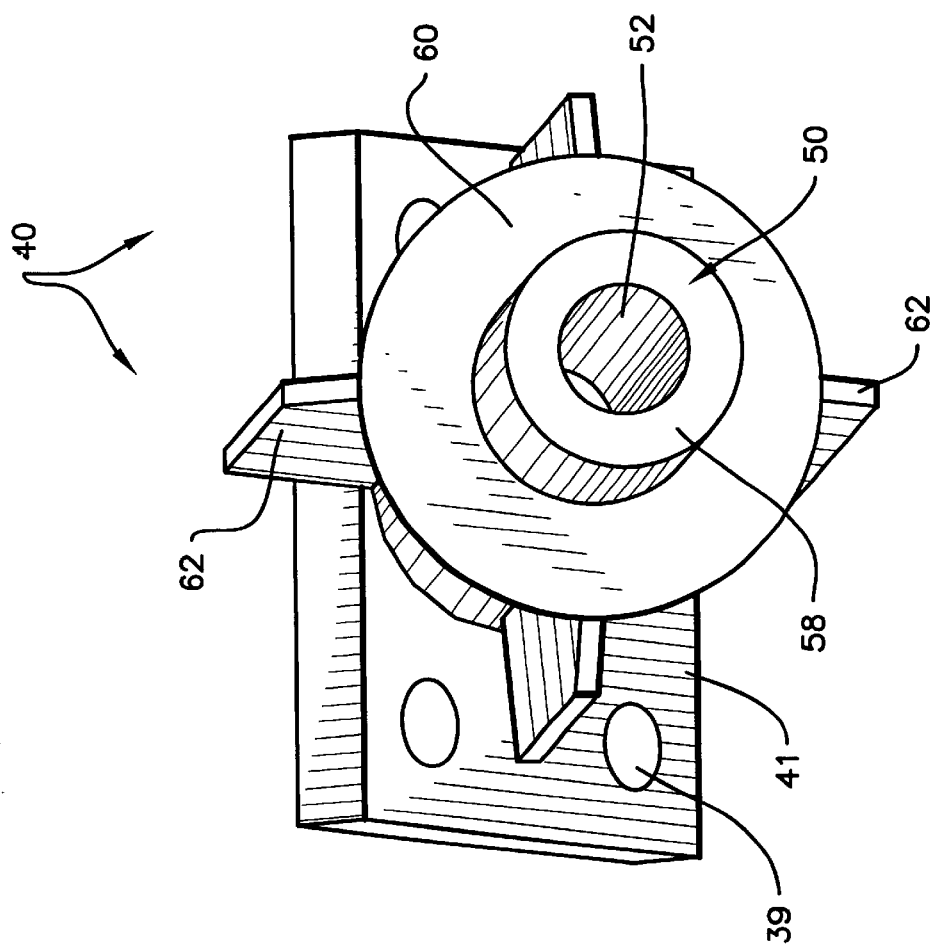
FIG. 8 is an isometric bottom view, taken from a position generally to the right of the image in Figure.

With primary reference now directed to FIGS. 3–4 and 6–8, the spindle assembly 40 preferably comprises a rigid, elongated sleeve 50 whose hollow interior communicates with interior bore 52. Sleeve 50 intersects flange 41 (FIG. 7) at an acute angle. Sleeve 50 has a bottom portion 54 integral with an upper intermediate portion 56 (FIG. 6). Bottom sleeve portion 54 has a larger internal diameter than adjacent, coaxial portion 56. Best viewed when detached from the hub assembly 42 (FIG. 7), the uppermost spindle assembly tubular portion 58 (FIG. 7) projects upwardly. Orifice 51 (FIG. 7) facilitates lubrication via external fitting 53 (FIG. 4). Tubular sleeve portions 54, 56, and 58 are coaxial and integral. An external, round shoulder flange 60 divides tubular sleeve portions 56, and 58. A plurality of rigid, elongated and generally rectangular reinforcing webs 62, 62A extend generally longitudinally between the upper shoulder flange 60 and the lower spindle flange 41 (FIG. 7, 8). Web 62A (FIGS. 3, 4) is welded at its bottom to flange 41. As best appreciated from FIG. 8, webs 62 and 62A are radially spaced apart about the external periphery of sleeve 50. Each web 62 is welded to shoulder flange 60 at its top, and terminates in a angled shoulder 65 (FIGS. 6, 7) forming the web bottom.

Figure 9:
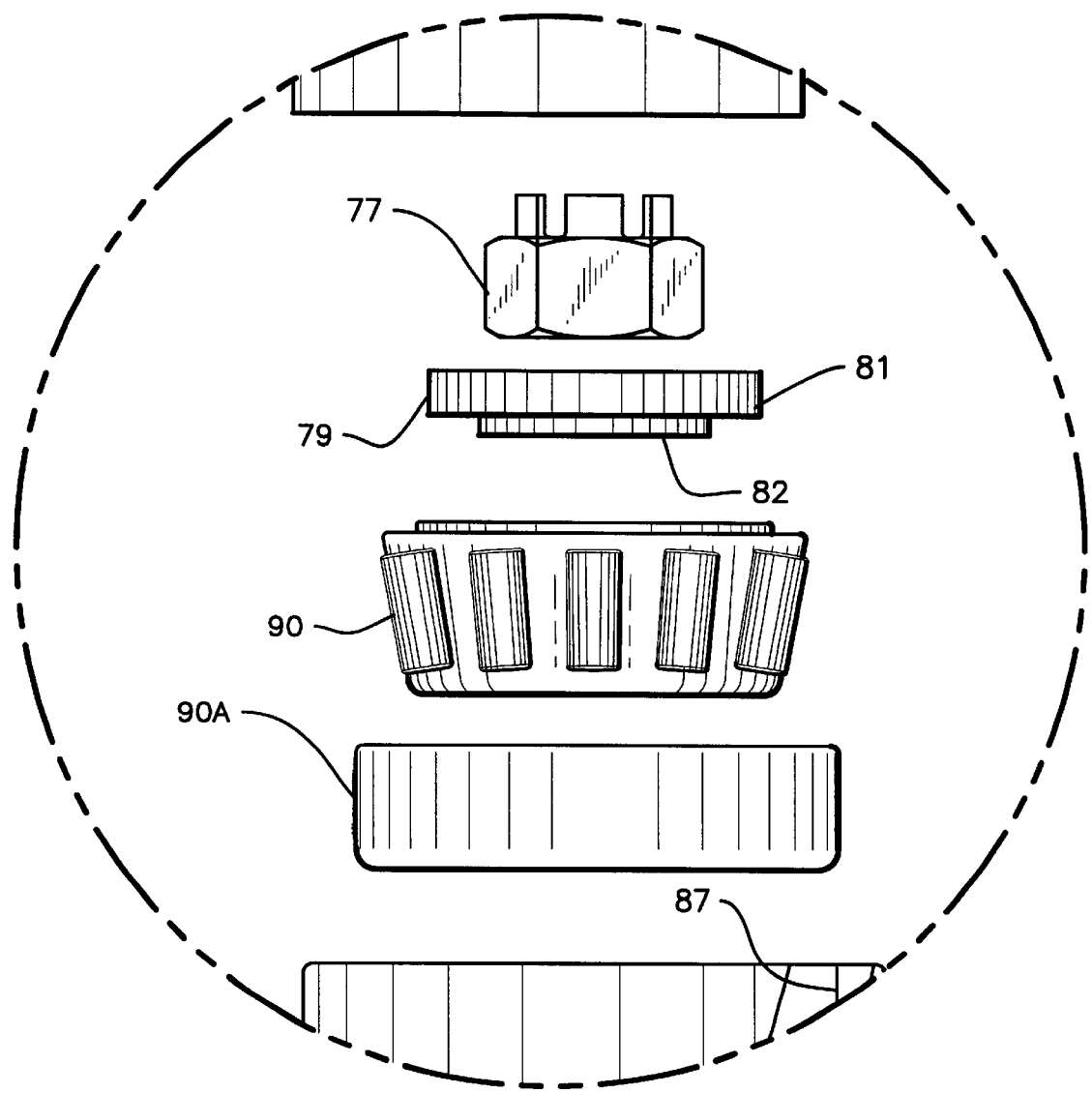
FIG. 9 is an enlarged view of circled region 9 in FIG. 2.
Figure 10:
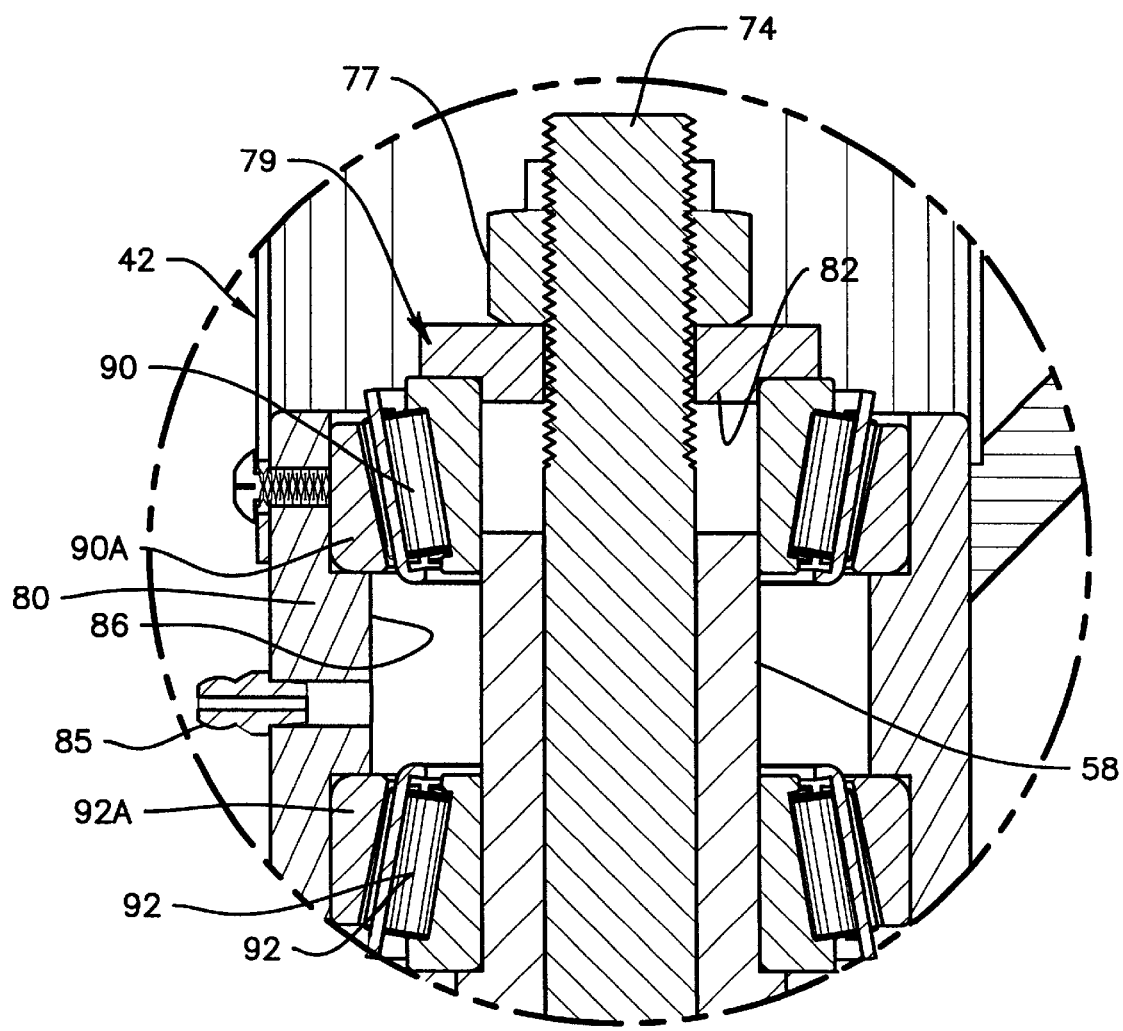
FIG. 10 is an enlarged view of circled region 10 in FIG. 6.

The rugged, aviation quality, industrial bolt 49 captivated within the assembly 20 is coaxially disposed within bore 52 (FIG. 6). Bolt 49 comprises a head 70 (FIG. 6) that abuts and is axially restrained by the shoulder (FIG. 6) formed between sleeve portions 54, 56. The bolt shank 72 extends upwardly though sleeve portion 58, into the hub assembly as described hereinafter. A threaded terminus 74 (FIGS. 2, 3, 6) integral with shank 72 receives castellated nut 77 (FIGS. 2, 3, 6) to complete the assembly. Through experimentation it was found that a special two-segment bushing 79, best seen in FIGS. 9 and 10 is desirable. Bushing 79 comprises an annular washer-like top 81 coaxially integral with a lower-diameter bottom portion 82. During the "preloading" or compression process, when nut 77 is tightened against bushing 79, the spindle assembly bearings are compressed together. Bushing 79 compresses the bearings axially, but bushing segment 82 aligns coaxially within the lower bearing, and tends to radially center the assembly to insure that relative rotation is possible. The spindle assembly is thus rotatably coupled to the hub assembly 42.

The rigid hub assembly 42 comprises a rigid, barrel-like hub portion 80 that is integral with the mounting arm 44 projecting angularly away from it. Arm 44 comprises a pair of spaced-apart and parallel sidewalls 83, 84 (FIG. 3) that are integral with a planar, center portion 85 in which mounting orifices 48 discussed earlier are defined. The aircraft tail spring 22 nests snugly between the sidewalls 83, 84 in compressive engagement with the flat, central arm portion 85. Lubrication of the interior of hub 80 is facilitated by fitting 85 (FIGS. 4, 6).

As best seen in FIG. 2, the interior of hub 80 comprises an integral ring portion 86 between a pair of recesses or counterbores 87, 88. Bearings 90, 92 (FIGS. 2, 6) are received within annular races 90A and 92A respectively. The races 90A, 92A (Fig. are nested coaxially within counterbores 87, 88, abutting shoulders on opposite sides of ring 86. Thus, bearings 90, 92 are and the corresponding races are all coaxially disposed within hub 80. As best seen in FIG. 6, the sleeve portion 58 extending upwardly from the spindle assembly coaxially penetrates the bearings 90, 92. Relative rotation between the hub assembly and the spindle assembly is thus enabled.

However, the preloading tension caused by nut 77, which is preferably torqued to about 100 foot pounds, maintains the assembly relatively stiffly, preventing it from vibrating or shimmying. However, normal forces exerted upon the wheel 26 (FIG. 1) when in contact with the runway can rotatably deflect the spindle assembly to compensate for the various positional vectors assumed by the alignment of the aircraft, the tail wheel and the landing surface. While rotation about the longitudinal axis of bolt 49 is possible during runway contact, preloading of the apparatus by properly torquing the assembly prevents vibration and shimmying.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A shimmy-free aircraft tail wheel mounting assembly comprising:
    a rigid, lower spindle assembly comprising a rigid, elongated, upwardly projecting sleeve and a lower mounting flange adapted to be secured to a conventional aircraft tail wheel fork to secure the tail wheel;
    an upper hub assembly coupled to said spindle assembly, the hub assembly comprising a rigid, central barrel-like hub, and rigid arm projecting angularly away from said hub for connection to the aircraft tail;
    said spindle sleeve extending coaxially within said hub;
    bearing means for axially securing said spindle assembly relative to said hub, while allowing relative rotation between said spindle assembly and said hub assembly;
    whereby the tail wheel fork is enabled to rotate to compensate for stress forces experienced by said tail wheel, while the tail wheel is secured against vibration in flight.

2. The tail wheel mounting assembly as defined in claim 1 wherein the hub arm is channel like in cross section, comprising a pair of spaced apart, parallel side walls integral with a central planar portion.

3. The tail wheel mounting assembly as defined in claim 1 wherein the hub comprises an internal bore, an internal ring, and a pair of spaced apart recesses on opposite ends of said ring within said bore.

4. The tail wheel assembly as defined in claim 3 wherein said bearing means comprises a bearing and a bearing race fitted within each of said hub races and nested against a shoulder provided by said internal ring.

5. The tail wheel assembly as defined in claim 4 wherein said spindle sleeve is secured by a coaxial, longitudinally-extending bolt centered within and penetrating said bearing means and axially securing said spindle assembly relative to said hub assembly.

6. The tail wheel assembly as defined in claim 5 further comprising a dividing flange between said spindle assembly and said hub assembly.

7. The tail wheel assembly as defined in claim 6 wherein said spindle assembly sleeve comprises a plurality of rigid, elongated reinforcing webs.

8. A shimmy-free aircraft tail wheel mounting assembly comprising:
    a lower spindle assembly comprising a rigid, elongated, upwardly projecting sleeve and means for securing the sleeve to a conventional aircraft tail wheel fork;
    an upper hub assembly rotatably coupled to said spindle assembly, the hub assembly comprising a rigid, central barrel-like hub, and means projecting away from said hub for connecting the hub to an aircraft tail spring;
    said spindle sleeve extending coaxially within said hub;
    upper and lower bearings within said hub for axially securing said spindle assembly relative to said hub, while allowing relative rotation between said spindle assembly and said hub assembly;
    an elongated, rigid bolt centered within said hub and penetrating said bearings for axially securing said spindle assembly relative to said hub assembly; and,
    nut means threadably engaging said bolt for preloading said mounting assembly by compressing said bearings;
    whereby the spindle is enabled to rotate about the bolt in response to predetermined forces.

9. The tail wheel mounting assembly as defined in claim 8 wherein the hub comprises an internal bore coaxially penetrated by the bolt, an internal ring, and a pair of spaced apart recesses on opposite ends of said ring within said bore that seat the bearings.

10. The tail wheel mounting assembly as defined in claim 8 further comprising a two part bushing for compressing the bearings.

11. The tail wheel mounting assembly as defined in claim 10 wherein the bushing comprises an upper washer portion and a lower, concentric reduced diameter portion that engages the upper bearing and radially centers the bearings.

12. The tail wheel assembly as defined in claim 11 further comprising a dividing flange between said spindle assembly and said hub assembly.

13. The tail wheel assembly as defined in claim 12 wherein said spindle assembly sleeve comprises a plurality of rigid, elongated reinforcing webs.

14. A shimmy-free aircraft tail wheel mounting assembly comprising:
    a spindle assembly comprising a rigid, elongated, upwardly projecting sleeve and means for securing the sleeve to a conventional aircraft tail wheel fork;
    a hub assembly adapted to be rotatably coupled to said spindle assembly, the hub assembly comprising an internal bore, an internal ring, and a pair of spaced apart recesses on opposite ends of said ring within said bore;
    means for connecting the hub assembly to an aircraft tail spring;
    said spindle sleeve extending coaxially within said bore;
    upper and lower bearings are seated within said recesses for securing said spindle assembly and enabling relative rotation between said spindle assembly and said hub assembly;
    an elongated, rigid bolt centered within said hub assembly and penetrating said bearings for axially securing said spindle assembly relative to said hub assembly;

nut means threadably engaging said bolt for preloading said mounting assembly by compressing said bearings;

bushing means pressured by said nut means for axially compressing said bearings while centering the bearings when the nut means is tightened for preloading;

whereby the spindle is enabled to rotate about the bolt in response to predetermined forces.

15. The tail wheel mounting assembly as defined in claim 14 wherein the bushing comprises an upper washer portion and a lower, concentric reduced diameter portion that engages the upper bearing and radially centers the bearings.

16. The tail wheel assembly as defined in claim 15 further comprising a dividing flange between said spindle assembly and said hub assembly.

17. The tail wheel assembly as defined in claim 16 wherein said spindle assembly sleeve comprises a plurality of rigid, elongated reinforcing webs.

* * * * *